March 19, 1935.  O. LELLEP  1,994,718
APPARATUS FOR TREATING FINELY DIVIDED MATERIAL
Original Filed Oct. 18, 1929
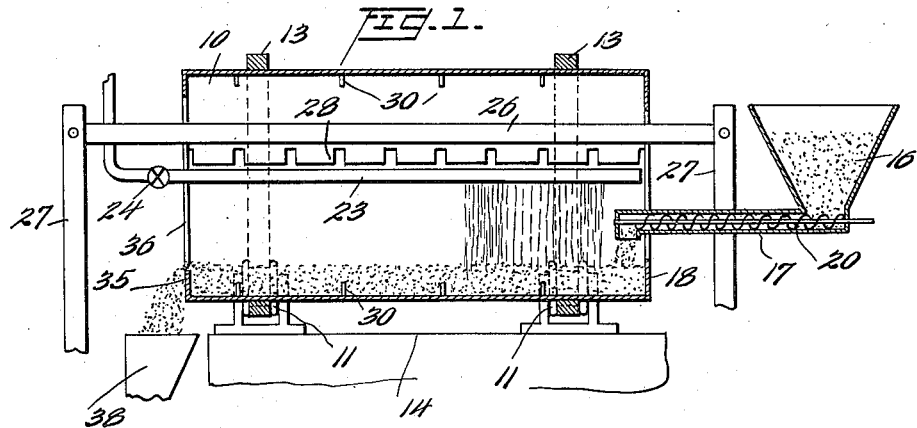
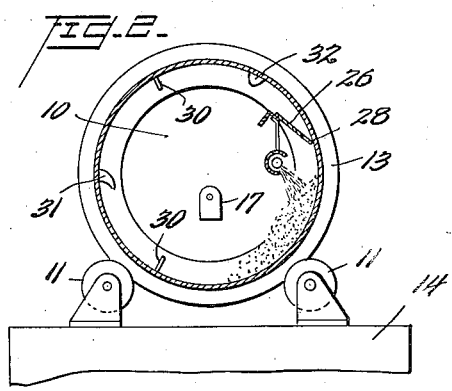
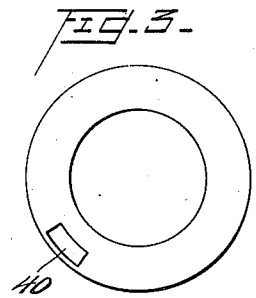
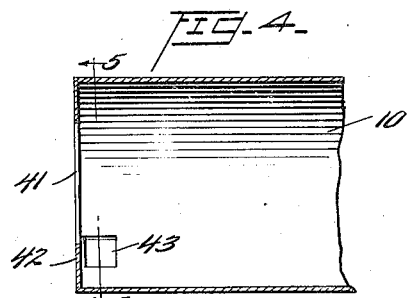
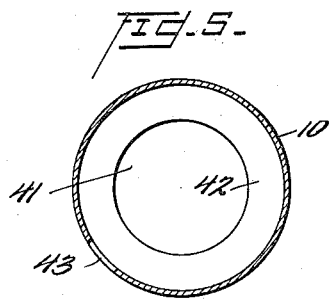
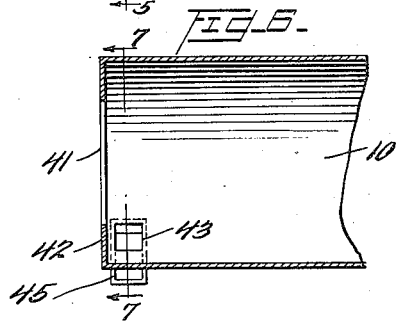
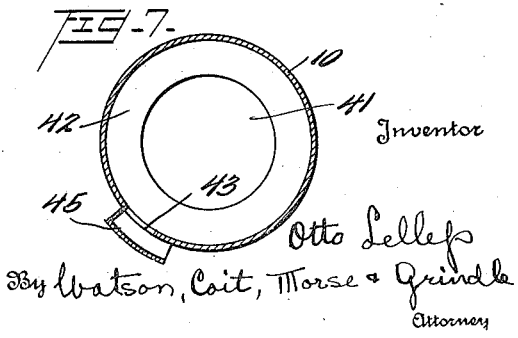
Inventor
Otto Lellep
By Watson, Coit, Morse & Grindle
Attorney Patented Mar. 19, 1935

1,994,718

UNITED STATES PATENT OFFICE 1,994,718

APPARATUS FOR TREATING FINELY DIVIDED MATERIAL

Otto Lellep, Duesseldorf, Germany, assignor to Lepol, Internationale Patentverwertungs-Gesellschaft m. b. H., Berlin, Germany, and N. V. "Solopol", Ingenieur-Bureau tot Exploitatie van het System Polysius, s-Gravenhage, Netherlands Original application October 18, 1929, Serial No. 400,705. Divided and this application August 23, 1934, Serial No. 741,176. In Germany December 15, 1927

8 Claims. (Cl. 18—1)

This invention relates to apparatus for the treatment of cement or similar pulverulent materials and more particularly to means for agglomerating cement raw material to facilitate the burning thereof. It is the principal object of the invention to provide a device of this character which will effect the agglomeration of the material in nodules of fairly uniform size and shape and of sufficient strength to withstand considerable agitation without breaking.

In my prior U. S. Patent 1,775,313, granted September 9, 1930, I have disclosed a process and an apparatus for preparing cement which has proven extremely effective and highly satisfactory from a commercial standpoint and which results in a substantial saving in operating costs and a decided improvement in the quality of the cement produced. It is an essential feature of my prior invention that the raw finely divided material is first agglomerated and thereafter preburned by hot gases which are forced through the agglomerated material, the preburned material being subsequently delivered to a rotary kiln for the final step of burning.

By effecting the preburning of the raw material in the form of agglomerates of the size of a pea or larger, excellent contact between the material and the hot gases is ensured and the heat receiving surfaces of the raw material are quite large as compared with the usual shaft kiln or rotary kiln practice. Again, by treating the material in the agglomerated form, the hot gases may be passed through the material without substantial obstruction to flow, and the rate of flow of gas may be accordingly materially increased. It is obvious, however, that if the agglomerates are too small, the flow of gas therethrough will be retarded and if they are too large, the interior of the nodules will not be subjected to the direct action of the hot gases and the effectiveness of the process will be accordingly decreased.

The importance of ensuring the production of nodules of substantially uniform size will therefore be readily appreciated, it being the primary purpose of the present invention to effect an improvement in the operation of the agglomerating apparatus shown in Figures 2 and 3 of my prior patent. This application is a division of my prior application Serial No. 400,705, filed October 18, 1929, the latter being directed more particularly to an improvement of that part of the apparatus disclosed in my prior Patent 1,775,313 relating to the preburning of the agglomerated material.

Further objects and features of the invention will be apparent from the following description taken in connection with the accompanying drawing, in which:

Figure 1 is a longitudinal sectional view of apparatus for agglomerating pulverulent material to which the invention has been applied;

Figure 2 is a transverse sectional view taken substantially on the line 2—2 of Figure 1;

Figure 3 is an end elevation of the agglomerating drum shown in Figures 1 and 2;

Figure 4 is a partial longitudinal sectional view illustrating a slightly modified form of the invention;

Figure 5 is a transverse sectional view on the line 5—5 of Figure 4;

Figure 6 is a partial longitudinal sectional view illustrating a further modification of the construction; and Figure 7 is a transverse sectional view on the line 7—7 of Figure 6.

In order to facilitate an understanding of the invention, specific language is used in describing the several embodiments thereof illustrated in the drawing. It will nevertheless be understood that no limitation of the scope of the invention is thereby intended and that various modifications and alterations are contemplated such as would occur to one skilled in the art to which the invention relates. For instance, while the invention is particularly applicable to the treatment of cement raw material and finds its principal use in connection with apparatus such as described in my prior Patent 1,775,313, it will be readily appreciated that the invention is in general applicable to the agglomeration of powdered material wherever it is desired to improve the quality and uniformity of size of the resulting agglomerates.

Referring now more particularly to the drawing, it will be observed that Figures 1 and 2 illustrate apparatus generally similar to that shown in my prior Patent 1,775,313, this apparatus including as its principal element a drum 10 which is preferably generally cylindrical in shape and which may be supported for rotation, for instance by rollers 11 engaging with annular races 13 surrounding the drum, the rollers being mounted on a suitable stationary support 14. The drum may be rotated in any convenient manner, for instance by means of a source of motive power associated with one or more of the rollers 11 which serve to support the drum.

Means are provided for introducing the material to be treated, for instance cement raw material, into one end of the drum, this being referred to for convenience as the inlet end. Thus a hopper 16 into which the material may be deposited is provided with a conduit 17 in communication with the lower end thereof, this conduit extending within the drum and through the opening at the inlet end of the drum, the latter being defined by the inwardly directed annular wall 18. A rotatable conveyor worm 20 within the conduit 17 may be employed to feed the material at a uniform rate from the hopper 16 to the drum 10 in the conventional manner.

A liquid supply pipe 23 extends within and is disposed generally longitudinally of the drum 10 throughout the entire length thereof, this pipe being provided with a valve 24 for controlling the flow of liquid therein and being apertured at spaced intervals along a portion or over the whole length thereof, the dimension of the apertures and the pressure of the liquid supplied through the pipe 23 being preferably so related that the liquid will fall in the form of drops or in a shower on the material within the drum. It is found that with this construction if the material to be treated is agitated or kept in motion by reasonably rapid rotation of the drum while the liquid is being thus supplied, each drop of liquid will form the nucleus of an agglomerate or nodule of the material which gradually builds up to the required size.

It will be understood that the size of these nodules is dependent to some extent upon the size of the drops of water or other liquid introduced, which is in turn controlled by the size of the apertures or by control of the pressure under which the water is supplied. As a general rule, in the treatment of cement raw material, it is found that apertures of .7 mm. diameter at a water pressure of .06 mm. will operate satisfactorily. Under these conditions a thin, substantially continuous jet of water flows from each aperture, this jet separating as it falls into drops which follow in rapid succession, the formation of the drops being effected at a distance of about 10 cm. from the pipe 23.

In addition to the upward and downward movement of the material along the peripheral walls of the drum, the material also moves steadily axially of the drum from the inlet toward the discharge end of the latter. This axial motion may be ensured either by slightly inclining the drum at a ratio of about 1: 100, or by the provision of conventional means within the drum for effecting positive displacement of the material. It is found that with cement raw material the quantity of water preferred is approximately 10% to 12% of the amount of material undergoing treatment, this percentage being sufficient to transform practically the entire quantity of material into agglomerates or nodules. At the outset these agglomerates are of irregular form and of weak structure, and relatively fragile. The continuous friction, however, developed between the nodules and between the drum walls and the nodules soon effects a rounding of the nodules which eventually assume substantially spherical shape, the strength thereof being gradually increased. The size of these nodules may vary from a diameter of several millimeters to about 20 mm. and more. The peripheral velocity of the drum may vary to a considerable extent but should not exceed that velocity at which the raw material is prevented by the action of centrifugal force from falling away from the walls of the drum. In general the torque required for the rotation of the drum is about equal to the driving force necessary for a tube mill. Thus if 0.5 kilowatt hours are employed to rotate the drum in the treatment of each barrel (170 kg.) of cement, the nodules will be sufficiently hard so that the greater portion thereof will not break when freely falling from a height of 2 meters.

It is of course possible to vary the agglomerating process to a considerable extent to modify the characteristics of the finished material. If it is desired, for instance, to produce agglomerates of a special strength, the raw material introduced into the drum may be saturated to a greater extent by increasing the flow of water through the pipe 23, additional raw material being introduced through a separate conveyor at a point near the middle of the drum as measured axially. This conveyor may be similar to that shown in Figure 1 for introducing the main portion of the material at the inlet end of the drum, the conveyor conduit being extended within the drum to the desired point. By such an arrangement the excessive moisture of the material may be reduced to say 10% of the amount of raw material being treated. Variation in the strength and size of the nodules may also be effected by alteration of the length over which the supply pipe 23 is perforated. Thus as illustrated more particularly in the drawing, the drops of water may be caused to fall only in about the first half of the length of the drum. In order to avoid adhesion of the material to the walls of the drum, a stationary scraping member 26 may be provided, this member being supported on suitable standards 27 and extending longitudinally through the drum 10, the toothed portion 28 of this member engaging the drum walls to remove the material therefrom.

When cement raw material is treated, it is of course advisable to maintain the water content at a reasonably low value in order to effect saving of the fuel required to burn the material. However, it has been found difficult to ensure satisfactory agglomeration of the material if the quantity of water employed is too small. Practice has shown that satisfactory results may be obtained with a water content of an amount approximately 8% to 16% of the amount of the dry pulverized material.

In order to avoid the formation during the process of agglomeration of lumps of material of irregular size, pins 30 may be provided on the interior surface of the drum, projecting radially inward therefrom and passing through the material as the drum is rotated and between the teeth of the member 26. These pins ensure continuous agitation of the material and serve to loosen the same and prevent the formation of lumps. In lieu of the pins 30, or in addition thereto, prongs or blades such as shown at 31 and 32 may be employed.

At or near the discharge end of the drum 10 an annular member or stow ring 35 is provided, this member preferably extending radially inward from the peripheral wall of the drum and serving to impede to some extent the discharge of material from the drum so that the completion of the process of agglomeration may be ensured. It will be observed that the member 35 affords a generally circular opening 36 at the discharge end of the drum through which the agglomerated material may pass, the discharged material falling into a hopper 38 located beneath the drum on which the material is delivered to a conveyor, preferably of the type shown in my prior Patent 1,775,313, where it is preburned by the hot waste kiln gases.

It is found that while the employment of a stow ring or the equivalent thereof is desirable, the larger agglomerates, which tend to collect adjacent the peripheral wall of the drum, are retained within the drum for a longer time than is desirable, building up to such a size that proper burning of the material cannot be effected. In order to avoid this lack of uniformity of size and character of the nodules, it is proposed by the present invention to discharge these larger nodules by the provision of an opening adjacent the periphery of the drum, this opening being preferably restricted in extent so that the larger nodules will be retained within the drum for substantially the same length of time as the smaller nodules which are discharged through the opening 36. Thus the member 35 may be provided with an opening 40 therein of limited circumferential extent and disposed in contiguous relation to the peripheral wall of the drum. As the drum rotates, this opening will periodically pass across the material contained in the lower portion of the drum and permit the discharge of a limited quantity of the larger nodules.

In the construction shown in Figures 4 and 5 a slightly modified arrangement is disclosed, the annular member 42 which defines the discharge opening 41 at the end of the drum being substantially continuous, an opening 43 being provided directly in the peripheral wall of the drum adjacent the discharge end of the latter so that the larger nodules may be delivered through this opening.

Figures 6 and 7 illustrate a modification of the arrangement shown in Figures 4 and 5, the opening 43 in the peripheral wall of the drum communicating with a discharge spout 45 which may lie in a generally circumferential direction and overlie the opening 43 so that the quantity of the larger nodules discharged at each rotation of the drum may be more accurately controlled. It will be understood that in all of these constructions both the smaller nodules which move through the generally circular opening nearer the axis of the drum and the larger nodules which are discharged through the smaller opening adjacent the periphery of the drum will fall within the same hopper 38 and pass therefrom to devices for effecting further treatment of the material.

By the employment of the apparatus hereinbefore described, exceptional homogeneity of the agglomerates is obtained and the formation of large balls and lumps of irregular size is prevented. Since the relative rate of discharge of the larger and smaller nodules may be altered by varying the relative sizes of the two discharge openings, the duration of the step of agglomeration as applied to each nodule may be maintained substantially constant, with the result that the strength, shape, and size of the individual nodules is remarkably uniform and a decided improvement in the treatment of cement raw material in accordance with the teachings of my prior Patent 1,775,313 can be effected.

Having thus described the invention, what is claimed as new and desired to be secured by Letters Patent is:

1. In apparatus for agglomerating powdered material, the combination with a container, of means for introducing the powdered material into the container, means for sprinkling liquid uniformly upon the powdered material within the container, and means for shifting the material during the sprinkling operation to distribute the liquid throughout the entire mass of the material, said container being generally cylindrical and having an opening spaced from the peripheral portion thereof for the discharge of smaller agglomerates and an opening contiguous to the peripheral portion thereof for larger agglomerates.

2. In apparatus for agglomerating powdered material, the combination with a container, of means for introducing the powdered material into the container, means for sprinkling liquid uniformly upon the powdered material within the container, said container being generally cylindrical and having an opening spaced from the peripheral portion thereof for the discharge of smaller agglomerates and an opening contiguous to the peripheral portion thereof for larger agglomerates, and means for rotating the container about the axis thereof.

3. In apparatus for agglomerating powdered material, the combination with a container, of means for introducing the powdered material into the container, means for sprinkling liquid uniformly upon the powdered material within the container, said container being generally cylindrical, having a material inlet end, and having an opening spaced from the peripheral portion thereof for the discharge of smaller agglomerates and an opening contiguous to the peripheral portion thereof for larger agglomerates, and means for rotating the container about the axis thereof.

4. In apparatus for agglomerating powdered material, the combination with a drum for receiving the material, of means extending within the drum for distributing liquid in the form of drops on the material therein, and means for rotating the drum whereby each drop of liquid forms a nucleus which builds up to a nodule of appreciable size by agglomeration, said drum being generally cylindrical and having an opening spaced from the peripheral portion thereof for the discharge of smaller agglomerates and an opening contiguous to the peripheral portion thereof for larger agglomerates.

5. In apparatus for agglomerating powdered material, the combination with a drum for receiving the material, of means extending within the drum for distributing liquid in the form of drops on the material therein, and means for rotating the drum whereby each drop of liquid forms a nucleus which builds up to a nodule of appreciable size by agglomeration, said drum being provided adjacent one end with an annular member extending radially inward from the periphery of the drum to provide an opening for the discharge of smaller nodules, said member having an opening therein adjacent the drum periphery and of limited circumferential extent for the discharge of large nodules.

6. In apparatus for agglomerating powdered material, the combination with a drum for receiving the material, of means extending within the drum for distributing liquid in the form of drops on the materal therein, and means for rotating the drum whereby each drop of liquid forms a nucleus which builds up to a nodule of appreciable size by agglomeration, said drum being provided adjacent one end with an annular member extending radially inward from the periphery of the drum to provide an opening for the discharge of smaller nodules, said drum having an opening in the periphery thereof adjacent said member of limited circumferential extent for the discharge of larger nodules.

7. In apparatus for agglomerating powdered material, the combination with a drum for receiving the material, of means extending within the drum for distributing liquid in the form of drops on the material therein, and means for rotating the drum whereby each drop of liquid forms a nuclueus which builds up to a nodule of appreciable size by agglomeration, said drum being provided adjacent one end with an annular member extending radially inward from the periphery of the drum to provide an opening for the discharge of smaller nodules, said drum having an opening in the periphery thereof adjacent said member of limited circumferéntial extent for the discharge of larger nodules, and a dscharge spout associated with said last named opening.

8. In apparatus for agglomerating powdered material, the combination with a drum for receiving the material, of means extending within the drum for distributing liquid in the form of drops on the material therein, and means for rotating the drum whereby each drop of liquid forms a nucleus which builds up to a nodule of appreciable size by agglomeration, said drum being provided adjacent one end with an annular member extending radially inward from the periphery of the drum to provide an opening for the discharge of smaller nodules, said drum having an opening in the periphery thereof adjacent said member of limited circumferential extent for the discharge of larger nodules, and a discharge spout associated with said last named opening, said discharge spout extending circumferentially with respect to the drum and about the associated opening.

OTTO LELLEP.